(12) United States Patent
Cao et al.

(10) Patent No.: US 11,945,658 B2
(45) Date of Patent: Apr. 2, 2024

(54) GENERAL PLATFORM FOR PROCESSING WORKPIECE

(71) Applicants: Tyco Electronics (Shanghai) Co. Ltd, Shanghai (CN); Tyco Electronics (Qingdao) Ltd., Qingdao (CN); TE Connectivity Services GmbH, Schaffhausen (CH)

(72) Inventors: Jian Cao, Shanghai (CN); Lvhai (Samuel) Hu, Shanghai (CN); Dandan (Emily) Zhang, Shanghai (CN); Fengchun (Fred) Xie, Shanghai (CN); An (Joshua) Yang, Shanghai (CN); Yun (Shanghai) Liu, Shanghai (CN); Wenhe Ma, Shanghai (CN); Peng Ji, Qingdao (CN); Zongjie (Jason) Tao, Shanghai (CN); Roberto Francisco-Yi Lu, Bellevue, WA (US); Tao Xu, Shanghai (CN)

(73) Assignees: TE Connectivity Solutions GmbH, Schaffhausen (CH); Tyco Electronics (Shanghai) Co., Ltd., Shanghai (CN); Tyco Electronics (Qingdao) Ltd., Qingdao (CN)

( * ) Notice: Subject to any disclaimer, the term of this patent is extended or adjusted under 35 U.S.C. 154(b) by 141 days.

(21) Appl. No.: 17/574,210

(22) Filed: Jan. 12, 2022

(65) Prior Publication Data
US 2022/0219912 A1    Jul. 14, 2022

(30) Foreign Application Priority Data

Jan. 12, 2021    (CN) .......................... 202110039481.7

(51) Int. Cl.
*B65G 47/46*    (2006.01)

(52) U.S. Cl.
CPC .................................. *B65G 47/46* (2013.01)

(58) Field of Classification Search
CPC ...................................................... B65G 47/46
See application file for complete search history.

(56) References Cited

U.S. PATENT DOCUMENTS

| 3,767,025 A | 10/1973 | Louis |
| 5,632,589 A | 5/1997 | Bray et al. |

(Continued)

FOREIGN PATENT DOCUMENTS

| CN | 105252180 A | 1/2016 |
| CN | 209265736 U | 8/2019 |

(Continued)

OTHER PUBLICATIONS

Chinese First Office Action dated May 17, 2023, with English translation thereof, corresponding to Application No. 202110039481.7, 14 pages.

(Continued)

*Primary Examiner* — Gene O Crawford
*Assistant Examiner* — Lester Rushin, III
(74) *Attorney, Agent, or Firm* — Barley Snyder

(57) ABSTRACT

A platform for processing a workpiece includes a transmission mechanism, a plurality of workstations and a plurality of movable vehicles. The transmission mechanism transports the workpiece to be processed to one of the plurality of workstations. Each movable vehicle includes a processing module and a docking interface adapted to connect with a docking station of each workstation. The movable vehicles are each adapted to move in and out of each workstation, and each processing module is adapted to process the workpiece transmitted to the workstation after the movable vehicle is moved in and positioned in the workstation.

20 Claims, 7 Drawing Sheets

(56) References Cited

U.S. PATENT DOCUMENTS

| | | | |
|---|---|---|---|
| 5,884,746 A | 3/1999 | Leisner et al. | |
| 6,681,915 B2* | 1/2004 | Pattantyus-Abraham | ................... B65G 47/5122 198/794 |
| 7,527,664 B2 | 5/2009 | Jackson | |
| 8,375,812 B2* | 2/2013 | Habisreitinger | ......... B25J 15/04 73/865.8 |
| 8,382,932 B2* | 2/2013 | Savoie | ................... C09J 133/10 451/384 |
| 8,616,150 B2* | 12/2013 | Savoie | .................. B24B 13/005 118/712 |
| 8,734,720 B2* | 5/2014 | Nichols | ..................... B01L 9/02 422/65 |
| 10,955,430 B2* | 3/2021 | Guarracina | ............ B25J 9/1679 |
| 11,123,870 B2* | 9/2021 | Gilchrist | ................ B25J 9/1694 |

FOREIGN PATENT DOCUMENTS

| | | |
|---|---|---|
| CN | 210606163 U | 5/2020 |
| DE | 4437364 A1 | 4/1996 |
| DE | 102006015551 A1 | 10/2007 |
| JP | H10101222 A | 4/1998 |

OTHER PUBLICATIONS

Chinese Second Office Action dated Oct. 13, 2023 with English translation, corresponding to Application No. 202110039481.7, 14 pages.

\* cited by examiner

GENERAL PLATFORM FOR PROCESSING WORKPIECE

CROSS-REFERENCE TO RELATED APPLICATIONS

This application claims the benefit of Chinese Patent Application No. CN202110039481.7 filed on Jan. 12, 2021 in the State Intellectual Property Office of China, the whole disclosure of which is incorporated herein by reference.

FIELD OF THE INVENTION

The present disclosure relates to workpiece processing, and more particularly, to a general platform for processing a variety of workpieces.

BACKGROUND

A variety of workpieces or products, such as conductive terminals for electrical connectors, are generally processed with various processing machines or processing platforms. Presently, existing processing machines or processing platforms are dedicated to a specific processes and products. These machines and platforms are not conducive to flexible switching configurations, limiting their usefulness to specific applications. Therefore, the compatibility or universality of conventional processing machines or processing platforms for various products or workpieces with different types or specifications is poor, and improved solutions are desired.

SUMMARY

According to an embodiment of the present disclosure, a platform for processing a workpiece includes a transmission mechanism, a plurality of workstations and a plurality of movable vehicles. The transmission mechanism transports the workpiece to be processed to one of the plurality of workstations. Each movable vehicle includes a processing module and a docking interface adapted to connect with a docking station of each workstation. The movable vehicles are each adapted to move in and out of each workstation, and each processing module is adapted to process the workpiece transmitted to the workstation after the movable vehicle is moved in and positioned in the workstation.

BRIEF DESCRIPTION OF THE DRAWINGS

The invention will now be described by way of example with reference to the accompanying Figures, of which.

DETAILED DESCRIPTION OF THE EMBODIMENTS

Figure 1:
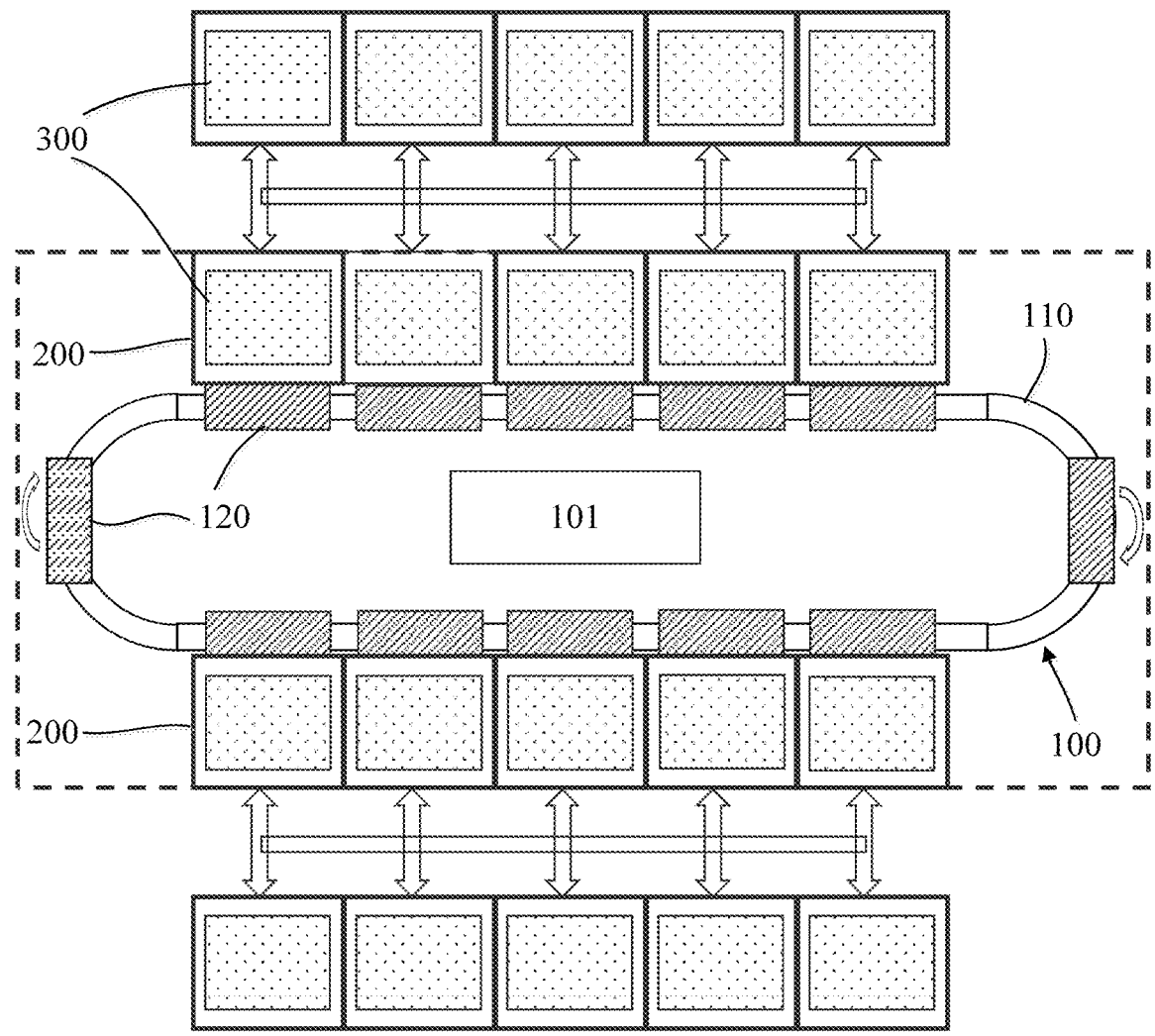
FIG. 1 is a plan view schematically showing an arrangement of a general platform for processing a workpiece according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a general platform for processing a workpiece includes a transmission mechanism for transmitting a workpiece to be processed. A plurality of workstations are associated with the transmission mechanism, wherein the workpiece to be processed is transported by the transmission mechanism to the workstation. A plurality of movable vehicles are provided, with each adapted to move in and out of each workstation and equipped with a processing module. The processing module is configured to process the workpiece transmitted to the workstation after the movable vehicle is moved in and positioned in the workstation. Each workstation comprises a docking station, and each movable vehicle comprises a docking interface suitable for connecting with the docking station of each workstation.

According to an exemplary embodiment of the present disclosure, the general platform can be arranged on a variety of product production lines for performing a variety of processing operations or processing operations on a variety of workpieces to obtain desired products, such as conductive terminals of various types or specifications (for example, various contours or shapes, sizes, etc.) for electrical connectors. For the conductive terminals, the processing operation or processing process of the workpiece may include the stamping and/or bending process of the metal strip by a stamping machine or die, electroplating process, inspection operation, packaging, molding and/or assembly, etc. These different processing operations or processes can be completed on a general platform according to embodiments of the present disclosure.

As shown in FIG. 1, the general platform for workpiece processing according to the embodiment of the present disclosure includes a transmission mechanism 100, a plurality of workstations 200 and a plurality of movable vehicles 300. The transmission mechanism 100 is used to load the workpiece to be processed, so as to transmit the workpiece between the workstations 200 according to the workpiece processing requirements. As an example, the transmission mechanism 100 may include a conveyor belt 110 and a workpiece carrying device 120 positioned on the conveyor belt 110. The conveyor belt may include, for example, an annular conveyor belt or a linear conveyor belt. The workpiece carrying device 120 is used to carry the workpiece to be processed and move with the conveyor belt 110 to transfer the workpiece to the destination workstation according to the processing requirements. For example, the workpiece carrying device can be various forms of workpiece carriers, such as pallets or loading fixtures. The plurality of workstations 200 are associated with the transmission mechanism 100. In one embodiment, the plurality of workstations 200 are arranged or positioned near the transmission mechanism 100 along the transmission mechanism 100 to receive the workpiece to be processed transmitted by the transmission mechanism.

Figure 4A:
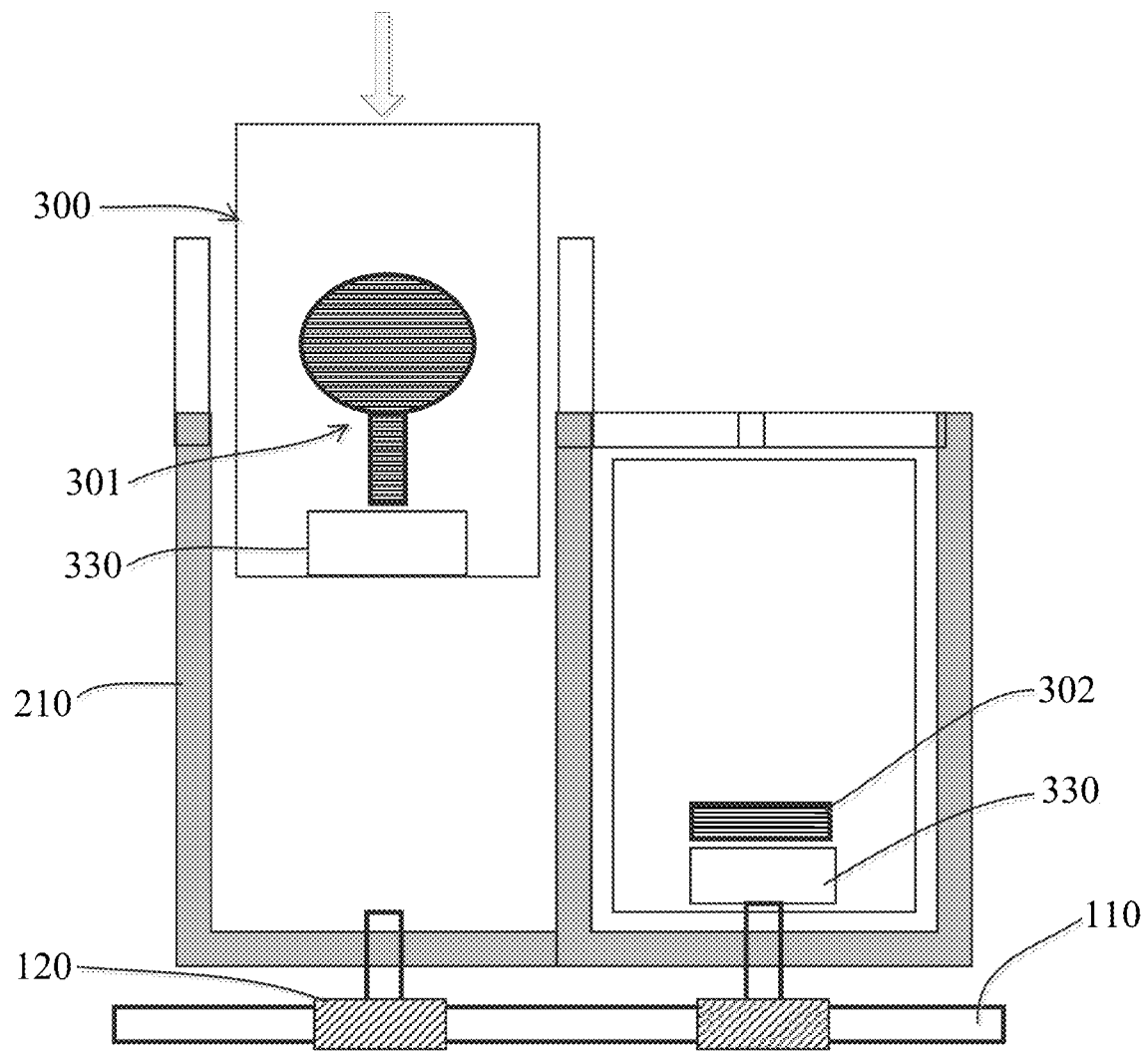
FIGS. 4A and 4B are schematic diagrams showing the operation of moving a movable vehicle of a general platform for workpiece processing into a workstation according to an exemplary embodiment of the present disclosure.
Figure 4B:
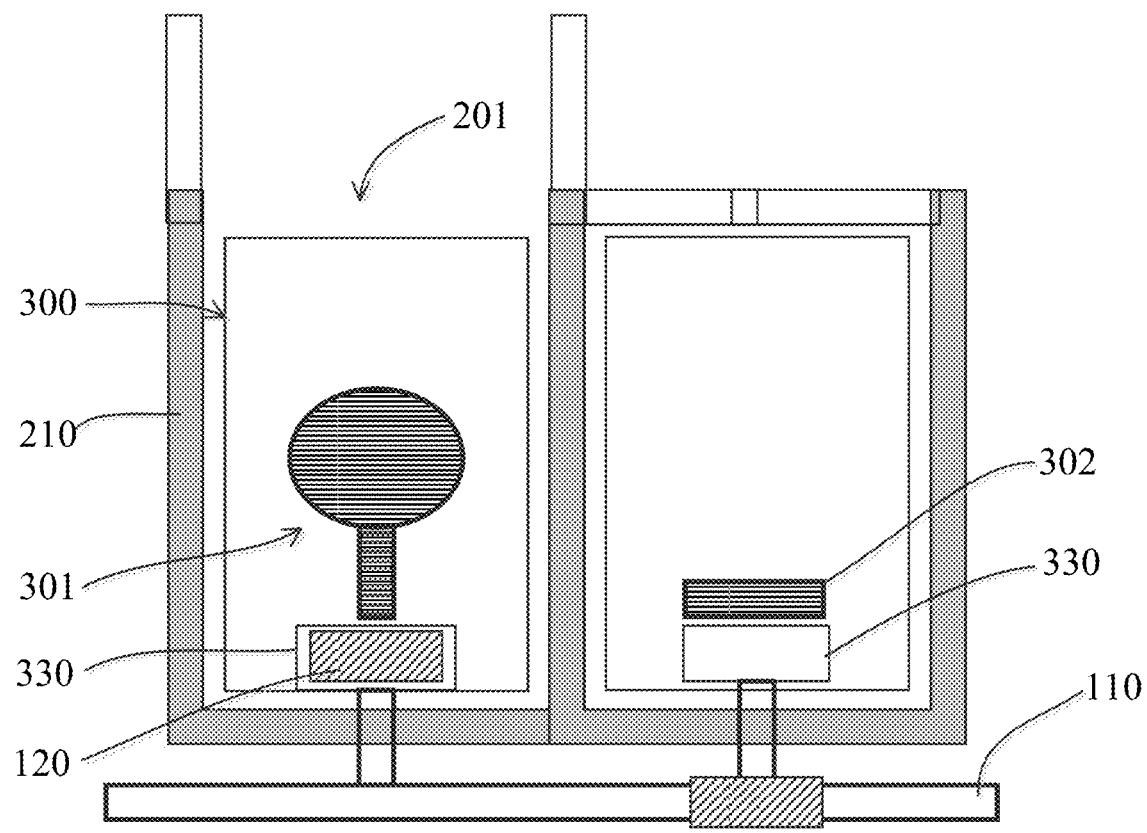
Figure 5:
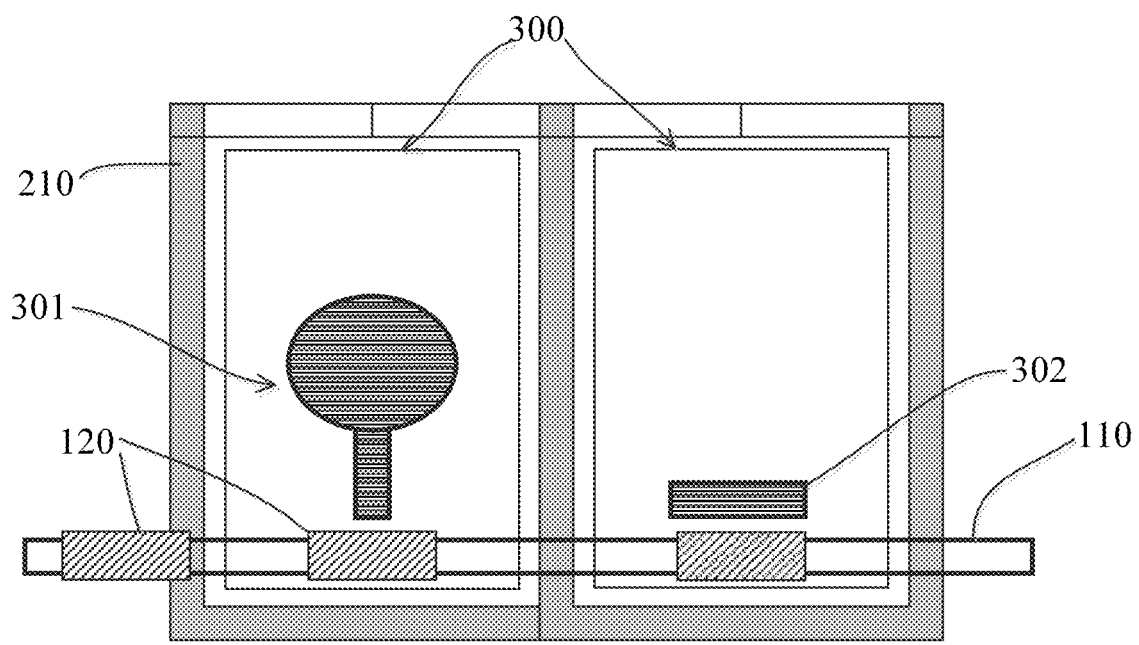
FIG. 5 is a plan view schematically showing an arrangement of a workstation, a movable vehicle and a transmission mechanism of a general platform for workpiece processing according to an exemplary embodiment of the present disclosure.

In an exemplary embodiment according to the present disclosure, the general platform includes or is compatible with a plurality of movable vehicles 300, each of which can move in and out of one or more workstations 200, or even all workstations, and is equipped with a processing module (such as processing module 301, 302, see FIGS. 4A to 5). The processing module can be operated under the control of the control system or the operator to process the workpiece transmitted to the workstation after the movable vehicle 300 is moved into and positioned in the corresponding workstation 200.

The processing module may include various forms of workpiece processing machines, such as punching machine, electroplating device, inspection device, molding machine, assembly device, etc., and different processing modules can be selected or configured according to the processing requirements of the workpiece. For example, the processing module can be removably installed on the movable vehicle to be replaced by different processing modules when necessary. At least some of the processing modules carried by the movable vehicle are suitable for processing the workpiece with different processing operations, or for performing different processing operations on the same production line. For example, in terminal manufacturing, one or more processing modules are suitable for stamping the workpiece, another one or more processing modules are suitable for bending the workpiece, another one or more processing modules are suitable for electroplating the workpiece, etc.

Figure 2:
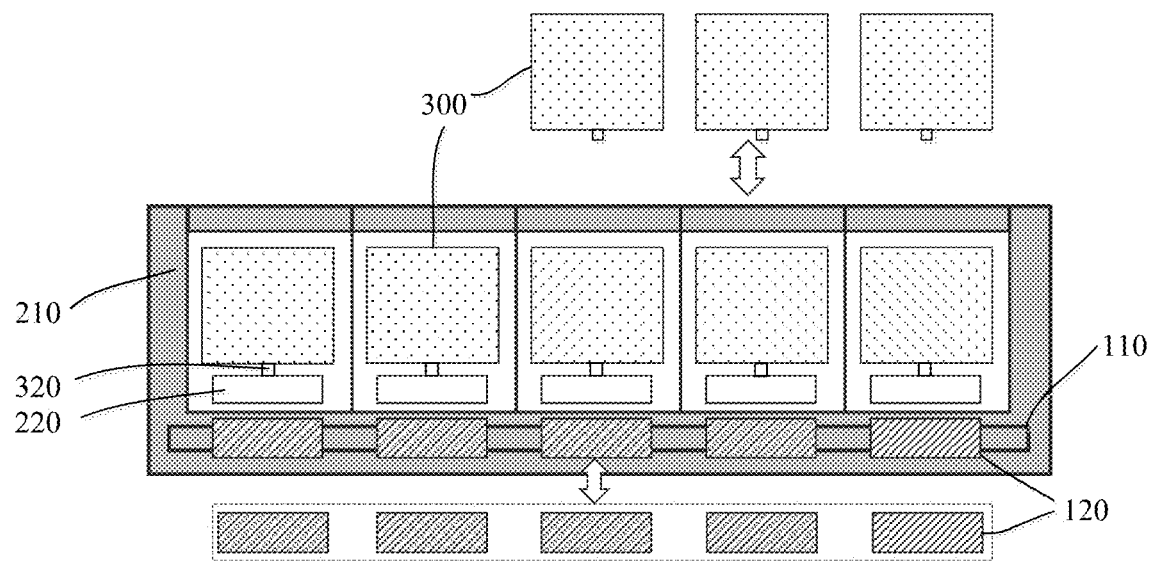
FIG. 2 is a plan view schematically showing an arrangement of a part of a general platform for processing a workpiece according to an exemplary embodiment of the present disclosure.

According to an exemplary embodiment of the present disclosure, as shown in FIG. 2, each workstation 200 includes a docking station 220, and each movable vehicle includes a docking interface 320 suitable for connecting with the docking stations 220 of multiple or even all workstations, so as to realize the positioning of the movable vehicle in the workstation through the connection between the docking interface 320 and the docking station 220. For example, the docking interface of each movable vehicle includes a general interface with the same specification (e.g., the same size, connection standard, function, etc.), which is suitable for connecting with the docking station of each workstation, which facilitates the exchange/replacement of each movable vehicle and its processing module between different workstations. Thus, according to different workpiece processing requirements, appropriate processing modules can be selected to be carried on the movable vehicle to realize different workpiece processing operations, which greatly improves the universality, layout flexibility and process compatibility of the workpiece processing platform. As will be described below, the docking interface is suitable for mechanical and/or electrical connection with the docking station in order to realize the positioning of the movable vehicle in the workstation, power supply to the processing module, signal communication/data transmission, etc. Although a single docking interface on the movable vehicle is shown in the illustrated embodiment, it will be understood that each movable vehicle or its processing module can be provided with one or more discrete or integrated docking interfaces, and each docking interface can realize different connection functions. Accordingly, each workstation can also be equipped with one or more docking stations.

As an example, a plurality of movable vehicles can be the same, such as having the same size, contour, structure, etc., so that they can be easily moved in and out of each workstation, which can further reduce the cost and simplify the platform layout, and the movable vehicles can carry various types of processing modules, which can further improve the scalability of the platform. The movable vehicle can be moved into or out of the workstation, or exchanged or replaced in the workstation in a variety of ways. FIG. 4A shows an operation example of the movable vehicle moving into the workstation of the general platform for workpiece processing according to the exemplary embodiment of the present disclosure, and FIG. 4B shows a state in which the movable vehicle has been moved into the workstation. As shown in the figure, the workstation 200 may also include a frame 210, which is arranged adjacent to the transmission mechanism 100 and defines the workpiece processing area. One side of the frame 210 away from the transmission mechanism 100 is provided with an entrance 201. When the entrance 201 is opened, the movable vehicle 300 can move into the workstation 200 under the control of the control system or be pushed into the workstation 200 by the operator, as shown by the arrow. Some or all of the movable vehicles 300 can be equipped with different processing modules 301 and 302 to perform different processing operations on the same or different workpieces in different workstations.

FIGS. 4A, 4B and 5 also illustrate different positioning arrangements of the transmission mechanism of the general platform relative to the workstation according to the embodiment of the present disclosure. As shown in FIGS. 4A and 4B, the conveyor belt 110 is positioned outside the workstation 200, and the movable vehicle 300 may be provided with a receiving device 330 for receiving the workpiece carrying device 120 transmitted by the conveyor belt 110 or receiving the workpiece, so that the processing modules 301, 302 carried by the movable vehicle 300 located in the workstation 200 can process the workpiece located in the receiving device 330. Alternatively, as shown in FIG. 5, the conveyor belt 110 may be configured to pass through each workstation 200 so that the processing module located in the workstation 200 can directly process the workpiece carried by the workpiece carrying device 120 positioned on the conveyor belt 110. After the processing is completed, the workpiece is directly taken away by the conveyor belt to leave or enter the next workstation, so as to save time.

Figure 6:
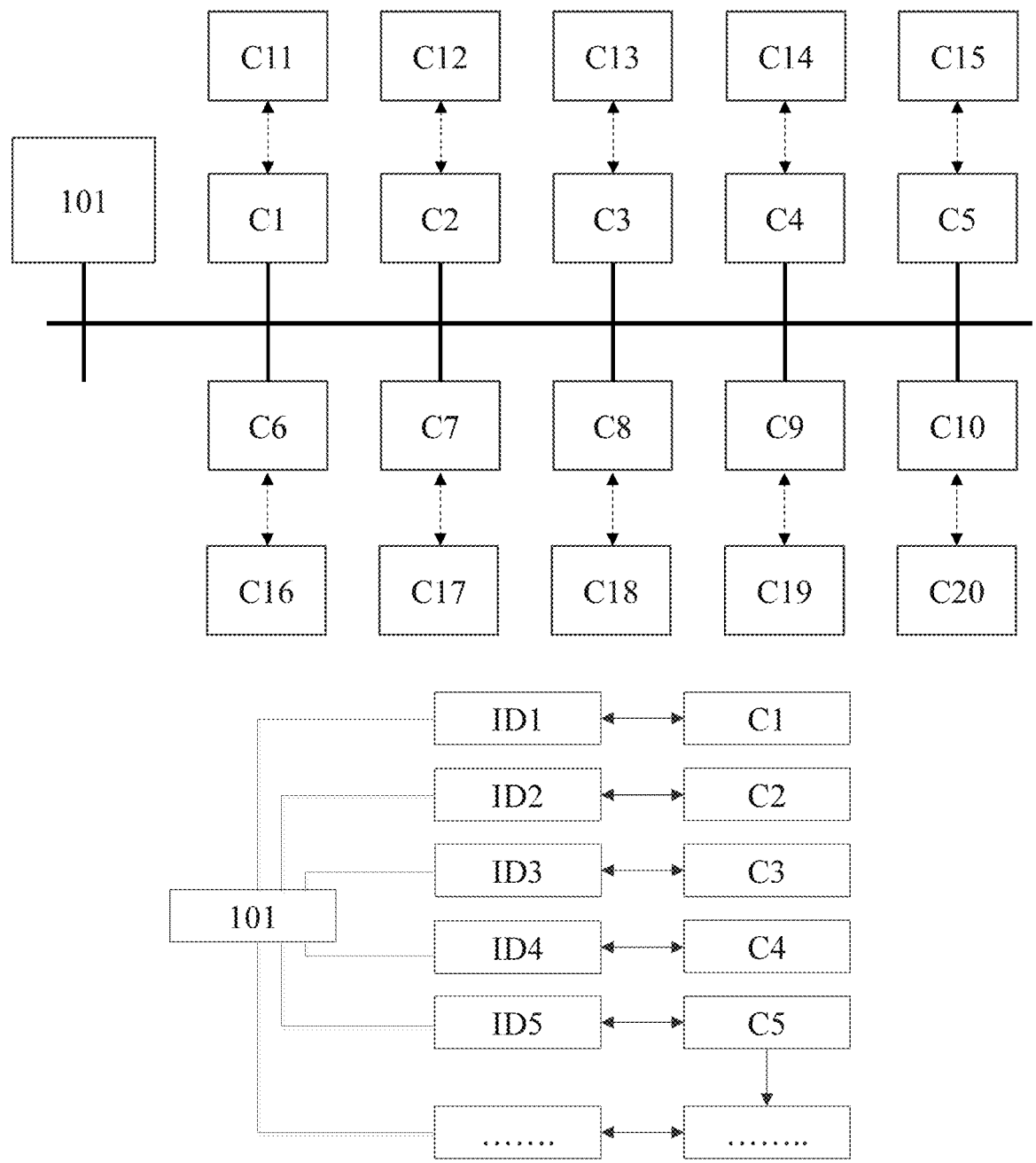
FIG. 6 is a block diagram schematically showing an arrangement of a control system of a general platform for workpiece processing according to an exemplary embodiment of the present disclosure.
Figure 7:
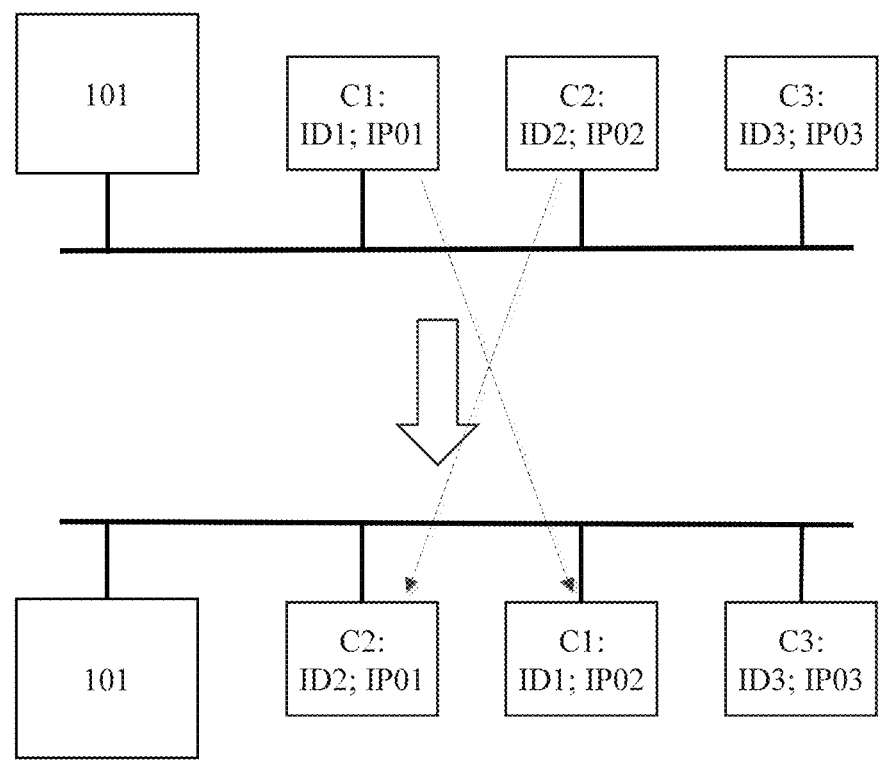
FIG. 7 is a block diagram schematically showing a switching configuration of a movable vehicle of a general platform for workpiece processing according to an exemplary embodiment of the present disclosure.

As shown in FIGS. 1, 6 and 7, the general platform according to the embodiment of the present disclosure also includes a main control system 101, which communicates with the transmission mechanism 100, the workstation 200 or its docking station 220 at least. In some examples, the main control system 101 may also communicate directly or indirectly (such as wired or wireless communication) with the movable vehicle 300 or the processing module carried thereon in order to control the operation related to the processing of the workpiece. The main control system can be realized by a variety of suitable controllers, processors and other hardware. It can be located at or near the general platform for workpiece processing, such as integrated on the platform control station, or remotely located or set in a remote control room. For example, the main control system can perform various control operations, such as controlling the movable vehicle to move in or out of the workstation, controlling the docking station of the workstation to connect to or disconnect from the docking interface of the movable vehicle moved into the workstation, controlling the transmission mechanism to transfer the workpiece to be processed to the corresponding workstation, and/or controlling the processing module carried by the movable vehicle moved into the workstation to process the workpiece, etc. It should be understood that these control operations can be automatically performed by the main control system based on the program preset or field programmed according to the desired workpiece processing process, or based on the instructions of the operator. In addition, one or more of these operations can also be manually controlled or performed by the operator.

As shown in FIG. 6, the main control system 101 can communicate with one or more movable vehicles C1-C20 through wired or wireless networks to facilitate the implementation or control of the arrangement and exchange of the movable vehicles, the processing of workpieces at the workstation by the processing module carried by the movable vehicle, etc. It should be understood that this communication can be realized through the connection between the docking station of the workstation and the docking interface of the movable vehicle, or by other wired or wireless communication methods.

Figure 3:
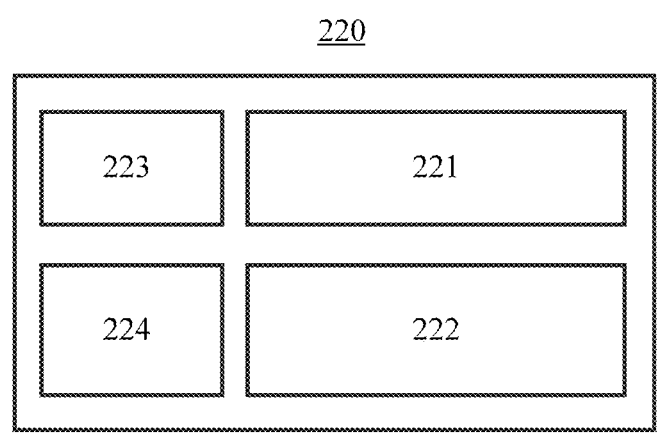
FIG. 3 is a block diagram schematically showing the configuration of a docking station in a workstation of a general platform for workpiece processing according to an exemplary embodiment of the present disclosure.

The connection between the docking station of the workstation and the docking interface of the movable vehicle may include mechanical connection, electrical connection, signal connection and/or power connection. As an example, as shown in FIG. 3, the docking station 220 may include or implement at least one of the mechanical connection interface 221, the signal interface 222 and the power interface 223. The mechanical connection interface 221 may be used for mechanical connection with the docking interface to position the movable vehicle 300 moved into the workstation in the workstation 200. The signal interface 222 is used for signal/data communication connection with the docking interface 320 to enable the main control system 101 to communicate with the movable vehicle and/or the processing module carried on it via the signal interface 222 and the docking interface 320, such as the communication or transmission of processing control signals, processing operation signals, processing parameters, vehicle code, etc. It is understood that the signal interface can be a wired or wireless interface. The power interface 223 may be used to provide the processing module with the power required to process the workpiece via the docking interface, such as mechanical power (e.g., pneumatic power, hydraulic power, etc.) and/or electrical power (e.g., a power supply to the processing module).

The docking station 220 may also include other devices 224, such as a memory for storing various signals, processing operation data performed by the processing module, process parameters for processing workpieces, codes for identifying the movable vehicles or the processing modules, etc. For example, through the connection between the docking station of the workstation and the docking interface of the movable vehicle, the main control system can obtain the vehicle code from the movable vehicle moved into the workstation or assign the vehicle code to the movable vehicle moved into the workstation. At least the movable vehicle moved into the workstation and the processing module carried on it are associated with the workpiece and the processing operation to be carried out on the workpiece. As an example, as shown in FIGS. 6 and 7, the vehicle code may include a unique vehicle identification code (vehicle identification codes ID1, ID2, ID3, ID4, ID5 . . . ) associated with the movable vehicle moved into the workstation (movable vehicles C1, C2, C3, C4, C5 . . . ). The vehicle address associated with the arrangement position of the movable vehicle in the workstation (vehicle addresses IP01, IP02, IP03 . . . ) as shown in the figure, the unique processing module identification code associated with the processing module carried by the movable vehicle moved into the workstation, and/or information related to the processing of the workpiece by the processing module, etc. It should be understood that according to various conditions, such as the specific processing module carried by the movable vehicle, the processing operation that the processing module can perform, the processing operation or processing process to be carried out on the workpiece, etc., the vehicle code can be set or assigned by the main control system, or by the sub control system of the movable vehicle or the processing module itself, or by the operator as required.

FIG. 7 shows an exchange example of a movable vehicle of a general platform for workpiece processing according to an exemplary embodiment of the present disclosure. As shown in the figure, at least three movable vehicles C1, C2 and C3 are respectively moved into the workstations. For example, the movable vehicle C1 can be equipped with a processing module for performing the first workpiece processing operation (such as blanking), the movable vehicle C2 can be equipped with a processing module for performing the second workpiece processing operation (such as bending), and the movable vehicle C3 may be equipped with a processing module for performing a third workpiece processing operation (such as electroplating).

In a processing process, the movable vehicles C1, C2 and C3 are arranged in this order, and have vehicle identification codes ID1, ID2 and ID3 and vehicle addresses IP01, IP02 and IP03 respectively, so as to process the workpiece in this order; In another processing procedure, different processing sequences may be adopted. For example, the arrangement positions of the movable vehicles C1 and C2 can be exchanged. At this time, the movable vehicles C2, C1 and C3 are arranged in this order and have the vehicle identification codes ID2, ID1 and ID3 and the vehicle addresses IP01, IP02 and IP03 respectively, and then the workpiece is processed in this order. It can be understood that in other examples, the vehicle identification code and/or vehicle address can be changed according to the specific processing process, or the processing sequence can also not correspond to the arrangement sequence of the movable vehicle, for example, it can be distributed or randomly assigned.

The general platform according to the embodiments of the present disclosure can run in a variety of modes. As an example, in the first mode, according to the processing requirements of the workpiece, the operator or the main control system carries out the arrangement or layout of the movable vehicles and the processing modules carried on them along the transmission mechanism according to the received processing related input information. The main control system or operator provides the first configuration scheme related to the arrangement or layout, and provides a second configuration scheme related to the processing operations to be performed on the workpieces by the processing modules. In this way, the movable vehicles and the processing modules carried on them are respectively positioned in the workstations according to the first configuration scheme, and each processing module performs the corresponding processing operation on the workpiece according to the second configuration scheme. In this mode, the main control system can identify the movable vehicle positioned in each workstation and its processing module through the vehicle code. The main control system transmits the processing parameters related to the processing operation performed on the workpiece to the corresponding processing module according to the second configuration scheme through the connection between the docking station and the docking interface or through other wired or wireless communication methods. In the alternative, the processing module downloads the processing parameters related to it from the main control system according to the second configuration scheme.

In the second mode, each movable vehicle or its processing module can be equipped with a sub control system, which can generate a configuration scheme related to the processing operation to be performed on the workpiece by the processing module in the sub control system. The configuration scheme can include processing parameters, and the main control system receives the configuration scheme after the movable vehicle is positioned in the workstation. According to the configuration scheme, the transmission mechanism is controlled to transmit the workpiece to the workstation, and the processing module carried by the movable vehicle is controlled to process the workpiece. In this mode, the main control system can also identify the movable vehicle positioned in each workstation and its processing module through the vehicle code, and receive the configuration scheme including processing parameters generated in the sub control system through the connection between the docking station and the docking interface or through other wired or wireless communication methods. The main control system or the sub control system itself can control the processing module to process the workpiece based on the processing parameters. In addition, in this mode, the arrangement or layout of the movable vehicles and the processing modules along the transmission mechanism can also be carried out in the main control system according to the processing requirements of the workpiece.

In the third mode, in the main control system, a third configuration scheme related to the processing operation to be performed on the workpiece by one or more processing modules is generated according to the processing requirements of the workpiece. A fourth configuration scheme related to the processing operation that can be performed on the workpiece by the processing module is generated in the sub control system of the movable vehicle or the processing module carried on it. The fourth configuration scheme may include processing parameters corresponding to the processing operation that can be performed on the workpiece by the processing module. After the movable vehicle is positioned in the workstation, the main control system receives the fourth configuration scheme and determines whether the processing operation represented by the fourth configuration scheme is at least part of the processing operation represented by the third configuration scheme. That is, determine whether the processing module can participate in the processing of the workpiece, if so, it can determine or control the processing module carried by the movable vehicle to process the workpiece.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:
1. A platform, comprising:
   a workpiece transmission mechanism including a conveyor belt and a workpiece carrying device positioned on the conveyor belt and moving therewith;
   a plurality of workstations associated with the transmission mechanism, each workstation including a docking station, the transmission mechanism transporting a workpiece to be processed to one of the plurality of workstations, the workpiece carrying device adapted to transfer the workpiece between various workstations of the plurality of workstations; and
   a plurality of movable vehicles, each movable vehicle includes:
      a processing module,
      a receiving device for receiving the workpiece carrying device transmitted by the conveyor belt, the processing module carried by the movable vehicle located at the workstation processes the workpiece carried by the workpiece carrying device located in the receiving device; and
      a docking interface adapted to connect with the docking station of each workstation, each movable vehicle adapted to move in and out of each workstation, the processing module is adapted to process the workpiece transmitted to the workstation after the movable vehicle is moved in and positioned in the workstation.
2. The platform according to claim 1, wherein the docking interfaces of movable vehicles are of the same size and configuration.

3. The platform according to claim 1, wherein the processing modules carried by at least some of the plurality of movable vehicles perform different processing operations on the workpiece.

4. The platform according to claim 1, wherein the plurality of movable vehicles are the same size and configuration.

5. The platform according to claim 1, wherein the conveyor belt is configured to pass through each workstation so that the processing module located at the workstation directly processes the workpiece carried by the workpiece carrying device on the conveyor belt.

6. The platform according to claim 1, wherein each docking interface at least one of mechanically or electrically connects to the docking station.

7. The platform according to claim 6, wherein at least one of the docking interfaces electrically connects to at least one of the docking stations.

8. The platform according to claim 1, further comprising a control system in electrical communication with at least the transmission mechanism and the docking station for controlling the operation of the plurality of movable vehicles.

9. The platform according to claim 8, wherein the control system further controls the operation of the transmission mechanism and each of the processing modules.

10. The platform according to claim 8, wherein each of the docking stations includes a mechanical connection interface for mechanically connecting with a corresponding docking interface to position the movable vehicle moved into the workstation.

11. The platform according to claim 10, wherein each of the docking stations further includes a signal interface for enabling the control system to communicate with the processing module via the signal interface and the docking interface.

12. The platform according to claim 11, wherein each of the docking stations further includes a power interface for providing power required for processing the workpiece to a corresponding processing module via the docking interface.

13. The platform according to claim 8, wherein the control system obtains a vehicle code from one of the movable vehicles moved into one of the workstations, or assign the vehicle code to the movable vehicle moved into the workstation, the vehicle code including a unique vehicle identification code associated with the movable vehicle moved into the workstation and/or information related to the processing of the workpiece by the processing module carried by the movable vehicle moved into the workstation.

14. The platform according to claim 13, wherein the control system provides a first configuration scheme related to the arrangement of the movable vehicles and the processing modules carried on them along the transmission mechanism and a second configuration scheme related to the processing operations to be performed on the workpiece by the processing modules, each movable vehicle and the processing module carried on it are positioned in the corresponding workstation according to the first configuration scheme, and each processing module performs the corresponding processing operation on the workpiece according to the second configuration scheme.

15. The platform according to claim 14, wherein each movable vehicle or the processing module carried thereon is provided with a sub control system configured to provide a configuration scheme related to the processing operation to be performed on the workpiece by the processing module, and the control system receives the configuration scheme after the movable vehicle is positioned in the workstation, controls the transmission mechanism to transmit the workpiece to the workstation according to the configuration scheme, and controls the processing module carried by the movable vehicle to process the workpiece.

16. The platform according to claim 15, wherein the control system is further configured to:
provide a third configuration scheme related to the processing operation to be performed on the workpiece by one or more processing modules according to the processing requirements of the workpiece, each movable vehicle or the processing module carried thereon is provided with a sub control system configured to provide a fourth configuration scheme related to the processing operation to be performed on the workpiece by the processing module; and
receive the fourth configuration scheme after the movable vehicle is positioned in the workstation and determine whether the processing operation represented by the fourth configuration scheme is at least part of the processing operation represented by the third configuration scheme, so as to determine whether the workpiece is processed by the processing module carried by the movable vehicle.

17. A platform for processing a workpiece, comprising:
a workpiece transmission mechanism;
a plurality of workstations associated with the transmission mechanism, each workstation including a docking station having a mechanical connection interface, a signal interface and a power interface, the transmission mechanism transporting the workpiece to be processed to one of the plurality of workstations;
a plurality of movable vehicles, each movable vehicle includes a processing module and a docking interface adapted to mechanically connect with the mechanical connection interface of each workstation to position the movable vehicle moved into the workstation, the processing module is adapted to process the workpiece transmitted to the workstation after the movable vehicle is positioned in the workstation, the power interface providing power required for processing the workpiece to a corresponding processing module via the docking interface; and
a controller operatively connected to the transmission mechanism and to each of the plurality of workstations, the signal interface enabling the controller to communicate with the processing module via the docking interface.

18. The platform according to claim 17, wherein the controller obtains a vehicle code from one of the movable vehicles moved into the workstation or assigns the vehicle code to the movable vehicle moved into the workstation, the vehicle code including at least one of a unique vehicle identification code associated with the movable vehicle moved into the workstation or information related to the processing of the workpiece by the processing module carried by the movable vehicle moved into the workstation.

19. A platform, comprising:
a workpiece transmission mechanism;
a plurality of workstations associated with the transmission mechanism, each workstation including a docking station, the transmission mechanism transporting a workpiece to be processed to one of the plurality of workstations;
a plurality of movable vehicles, each movable vehicle includes a processing module and a docking interface adapted to connect with the docking station of each workstation, and is adapted to move in and out of each workstation, the processing module is adapted to process the workpiece transmitted to the workstation after the movable vehicle is moved in and positioned in the workstation; and a control system in electrical communication with at least the transmission mechanism and the docking station, the control system controlling:

the processing modules of the plurality of moveable vehicles; and the movement of the plurality of movable vehicles at least one of into or between the plurality of workstations.

20. The platform according to claim 19, wherein the control system provides:

a first configuration scheme related to an arrangement of the movable vehicles and the processing modules carried on them along the transmission mechanism; and a second configuration scheme related to the processing operations to be performed on the workpiece by the processing modules, wherein:

each movable vehicle and the processing module carried on it are positioned in the corresponding workstation according to the first configuration scheme; and each processing module performs the corresponding processing operation on the workpiece according to the second configuration scheme.

\* \* \* \* \*